United States Patent [19]

Ueda

[11] Patent Number: 5,712,786
[45] Date of Patent: Jan. 27, 1998

[54] IDLING SPEED CONTROL METHOD AND APPARATUS FOR AN INTERNAL COMBUSTION ENGINE

[75] Inventor: Katsunori Ueda, Tokyo, Japan

[73] Assignee: Mitsubishi Jidosha Kogyo Kabushiki Kaisha, Tokyo, Japan

[21] Appl. No.: 321,606

[22] Filed: Oct. 12, 1994

[30] Foreign Application Priority Data

Oct. 12, 1993 [JP] Japan .................................. 5-254505

[51] Int. Cl.$^6$ .............................. G06G 7/70; F02M 3/00; H02H 7/06
[52] U.S. Cl. ........................ 364/431.07; 364/431.03; 123/339.1; 123/339.1 A; 123/339.18; 322/25; 322/29; 290/40 A; 290/40 C
[58] Field of Search ................... 364/431.07, 431.03, 364/434.04; 290/40 C, 40 B, 40 A, 40 F; 477/109, 107; 123/399, 438, 585, 352, 339.11-339.18, 339.21, 418, 353, 339.1, 339.14; 322/21, 23, 22, 24, 33, 28, 25, 27, 29, 38, 99, 14; 320/64, 12

[56] References Cited

U.S. PATENT DOCUMENTS

| | | | |
|---|---|---|---|
| 4,297,978 | 11/1981 | Matsui | 123/339 |
| 4,491,108 | 1/1985 | Hasegawa et al. | 123/339.18 |
| 4,510,903 | 4/1985 | Sakakiyama | 123/339 |
| 4,629,968 | 12/1986 | Butts et al. | 322/29 |
| 4,989,565 | 2/1991 | Shimomura et al. | 123/339 |
| 5,054,446 | 10/1991 | Ohuchi | 123/339.18 |
| 5,065,717 | 11/1991 | Hosokai et al. | 123/339 |
| 5,111,788 | 5/1992 | Washino | 123/339 |
| 5,146,888 | 9/1992 | Sawamoto | 123/339 |
| 5,235,946 | 8/1993 | Fodale et al. | 123/339 |
| 5,270,575 | 12/1993 | Togai et al. | 290/40 C |
| 5,352,971 | 10/1994 | Nishimura | 123/339 |
| 5,467,008 | 11/1995 | Uchinami | 322/27 |

FOREIGN PATENT DOCUMENTS

| | | | |
|---|---|---|---|
| 117964 | 5/1989 | Japan | 123/339.18 |
| 193052 | 8/1989 | Japan | 123/339.18 |

Primary Examiner—Jacques Louis-Jacques

[57] ABSTRACT

An idling speed control method and apparatus in which the field current of an alternator is turned on and off to control the power generation rate of the alternator in accordance with the terminal voltage of a battery, and the air intake of an internal combustion engine is increased and decreased to keep the engine speed at a target speed during an idle operation of the engine such that the field current of the alternator is gradually increased toward a field current value corresponding to an electric load when the electric load is increased suddenly. A battery current consumption value is estimated from the detected state of the battery, a generated current value of the alternator is detected, the value of an electric load current to be outputted from the alternator is obtained in accordance with the sum of the estimated battery current consumption value and the generated current value of the alternator, and the air intake is increased when a set value is exceeded by the electric load current value.

6 Claims, 9 Drawing Sheets

IDLING SPEED CONTROL METHOD AND APPARATUS FOR AN INTERNAL COMBUSTION ENGINE

BACKGROUND OF THE INVENTION

1. Field of the Invention

The present invention relates to an idling speed control method and apparatus for an internal combustion engine, and more particularly, to a method and an apparatus capable of stabilizing the idling speed control despite a sudden increase of electric loads during idle operation.

2. Description of the Related Art

As an effective method for improving the fuel efficiency of an internal combustion engine of a vehicle, there is a method known in the art in which the engine is operated with its idling speed kept at a target speed as low as about 600 rpm. Also, there is a known apparatus which controls the idling speed of an engine in the vicinity of a target speed by opening and closing an intake by-pass valve (idling speed control valve) in a by-pass passage for by-passing a throttle valve in an intake passage, or by forcing the throttle valve to open or close independently of manual operation, thereby adjusting the air intake rate.

If the idling speed is reduced to a lower target speed to improve the fuel efficiency, rotation is liable to fluctuate as the loads vary. Once a substantial fluctuation in rotation occurs, moreover, the engine speed cannot be quickly restored to the target speed. In order to prevent the generated current value from suddenly increasing to lower the idling speed when an electric load is applied, in particular, it is effective to increase the air intake rate by opening an air intake control valve, such as the aforesaid intake by-pass valve (ISC valve), in accordance with the generated current value. In the case of an engine whose intake pipe has a large capacity, however, its rotational speed is transiently lowered due to a shortage of the air intake even though the intake by-pass valve is opened, since the increase of the air intake rate is subject to a delay.

As a measure to solve these problems, an idling speed control method is described, for example, in U.S. Pat. No. 5,270,575 issued Dec. 14, 1993, in which the generated current of an alternator is detected, and the rate of its increase is restricted when an electric load is applied.

If the opening of the by-pass valve is increased in response to the restricted generated current value, however, a shortage of the air intake is also caused due to a delay of the increase of the air intake rate behind the rate of increase of the by-pass valve opening. Accordingly, a short-intake state lasts such that the engine speed is lower than the target speed.

An idle-cylinder engine is a generally-known engine which is designed so that its output can be lowered to improve the fuel efficiency of the engine by laying half of cylinders, e.g., two cylinders of a four-cylinder engine, idle during low-speed operation. In the engine of this type, the aforesaid reduction of the speed is accelerated when the electric load is applied. Thus, when some of cylinders of the idle-cylinder engine are laid idle during idle operation, the intake pipe capacity for each of the acting cylinders is larger in the idle operation than in full-cylinder operation. Even when the intake by-pass valve is opened in order to increase the air intake suddenly, therefore, the air intake actually does not do so. Even though the idling speed is controlled by adjusting the opening of the intake by-pass valve in the conventional manner, therefore, the engine output cannot be prevented from changing slowly by the restraint of the power generation of the alternator only. Accordingly, the engine torque suffers a prolonged shortage, so that it is very difficult to prevent the idling speed from lowering.

Moreover, the current value can be restricted to the no-load level by restraining the generated current from suddenly increasing from a no-load state. In a control device of a type such that the presence/absence of an electric load is recognized from the generated current value, the size of the load cannot be identified by the current value. In the initial stage of electric load application, therefore, the air intake rate cannot be previously stepped up in accordance with the size of the electric load. When a large electric load is applied, in particular, the aforesaid prolonged lowering of the idling speed cannot be avoid.

FIGS. 9A to 9D show an example of idling stability obtained when an electric load is applied to an idle-cylinder engine according to the conventional idling speed control method. When the electric load is applied during idle operation, an engine control unit gradually increases the by-pass valve opening in accordance with the generated current value (as indicated by arrow B of FIG. 9B) while restraining the current value from increasing suddenly (FIG. 9C). Even after the electric load is applied, according to this conventional method, it cannot be detected before the generated current value exceeds a decision value. Before the load is discriminated, therefore, the by-pass valve opening is not increased (during period A of FIG. 9B). Also after the discrimination of the load, the by-pass valve opening increases bit by bit in accordance with the generated current value of the alternator, so that the increase of the air intake is very slow (as indicated by arrow B in FIG. 9B). Thus, the reduction of the engine speed according to the conventional control method can be lessened (FIG. 9A) only by restraining the power generation rate of the alternator for a longer period of time. If this is done, however, the possibility of over-discharge of a battery increases (during period C of FIG. 9D).

SUMMARY OF THE INVENTION

The object of the present invention is to provide an idling speed control method and apparatus for an internal combustion engine, which ensure high idling stability against fluctuations of electric loads, and in which operation of some of cylinders of the engine can be interrupted during idle operation, and the target idling speed can be set at a lower value, so that the fuel efficiency can be improved.

According to one aspect of the present invention, there is provided an idling speed control method and apparatus in which the field current of an alternator is turned on and off to control the power generation rate of the alternator in accordance with the terminal voltage of a battery, and the air intake of an internal combustion engine is increased and decreased to keep the engine speed at a target speed during an idle operation of the engine such that the field current of the alternator is gradually increased toward a field current value corresponding to an electric load when the electric load is increased suddenly.

According to the method and apparatus of the invention, the state of the battery is detected, a battery current consumption value is estimated from the detected battery state, a generated current value of the alternator is detected, the value of an electric load current to be outputted from the alternator is obtained in accordance with the estimated battery current consumption value and the generated current value of the alternator, preferably in accordance with the sum of the battery current consumption value and the generated current value of the alternator, and the air intake is increased in accordance with the electric load current value.

Immediately after the electric load is increased suddenly during the idle operation, the electric load current value to be outputted from the alternator is quickly obtained from a drop of the battery voltage, etc., and the air intake is increased in accordance with the obtained current value. By increasing the generated current value of the alternator with the increase of the air intake, on the other hand, the load torque (power generation rate) and the engine output torque are balanced with each other to keep the engine speed for the idle operation constant.

Preferably, the air intake is increased when a set value is exceeded by the obtained electric load current value, and the increment of the air intake is set in accordance with the electric load current value.

Preferably, according to another aspect of the present invention, the air intake is increased when a first set value is exceeded by the obtained electric load current value, the increment of the air intake being set in accordance with the difference between the electric load current value and a second set value which is smaller than the first set value.

The above and other objects, features, and advantages of the invention will be more apparent from the ensuing detailed description taken in connection with the accompanying drawings.

BRIEF DESCRIPTION OF THE DRAWINGS

FIGS. 8A to 8E are time-based state diagrams for idle operation of an engine to which an idling speed control method according to the invention is applied, in which FIG. 8A shows the change of the battery voltage with time, FIG. 8B shows the change of the engine speed with time, FIG. 8C shows the change of the opening of an idling speed control (ISC) valve with time, FIG. 8D shows the change of the electric load current value with time, and FIG. 8E shows the change of the generated current value with time; and FIGS. 9A to 9D are time-based state diagrams for idle operation of an engine to which a conventional idling speed control method is applied, in which FIG. 9A shows the change of the engine speed with time, FIG. 9B shows the change of the opening of an ISC valve with time, FIG. 9C shows the change of the generated current value with time, and FIG. 9D shows the change of the battery voltage with time.

DETAILED DESCRIPTION OF THE PREFERRED EMBODIMENTS

Figure 1:
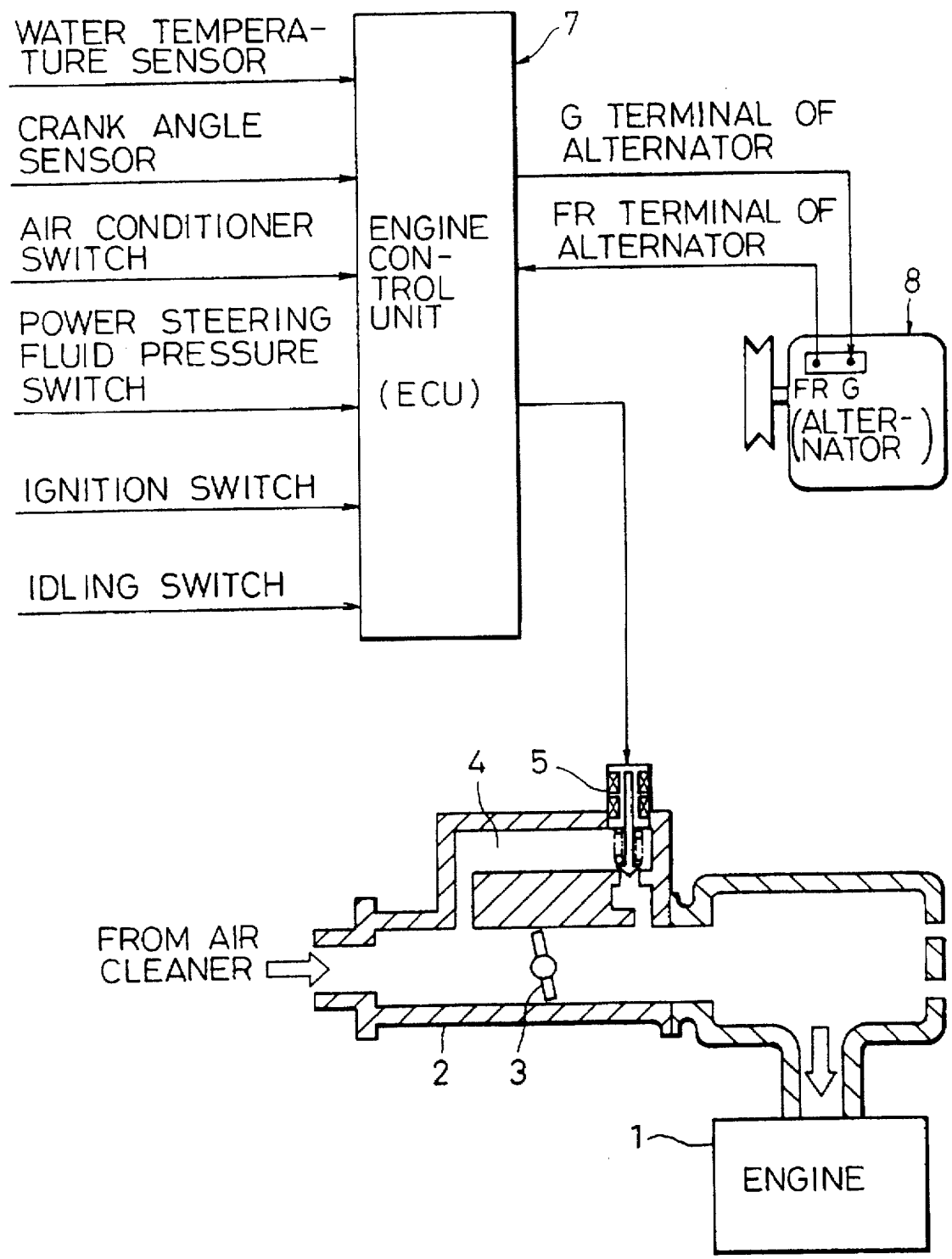
FIG. 1 is a schematic view of an idling speed control apparatus according to the present invention.

FIG. 1 shows an outline of an idling speed control apparatus for an engine according to the present invention. An intake pipe 2 of the engine 1 is provided, in the middle thereof, with a throttle valve 3 and a by-pass passage 4 for by-passing the valve 3. The by-pass passage 4 is provided with an ISC valve (air intake control valve) 5 for idling speed control (ISC). The ISC valve 5 is driven by means of a stepping motor to open and close the by-pass passage 4, thereby controlling the intake of air which is sucked into the engine 1 in an idling mode. Numeral 8 denotes an alternator, whose rotor is rotated by means of the engine 1 with the aid of a belt (not shown).

The engine 1 to which the present invention is applied may be the aforementioned idle-cylinder engine or an engine of a type such that vertical laminar eddies of an air-fuel mixture and air are formed in cylinders to undergo lean combustion. Moreover, the air intake control valve 5 is not limited to the aforesaid ISC valve, and may alternatively be of a type such that it can force a throttle valve in the middle of an intake pipe to open and close without regard to artificial operation, for example.

An engine control unit 7 is used to effect the control of the output current of the alternator 8, idling speed control which is based on the adjustment of the opening of the ISC valve 5 in accordance with the engine load, and the like. The unit 7 is connected electrically, on the input side thereof, with a neutral switch of a transmission, electric load switch, vehicle velocity sensor, etc., as well as a water temperature sensor, crank angle sensor, air conditioner switch, power steering fluid pressure switch, ignition switch ST, idling switch, etc. The unit 7 is supplied with engine operation mode signals from these sensors and switches. The input of the unit 7 is also connected electrically with FR and G terminals of the alternator 8. Thus, the unit 7 receives a signal from the FR terminal, and controls conduction between the G terminal and the ground, thereby controlling the output current of the alternator 8.

Figure 2:
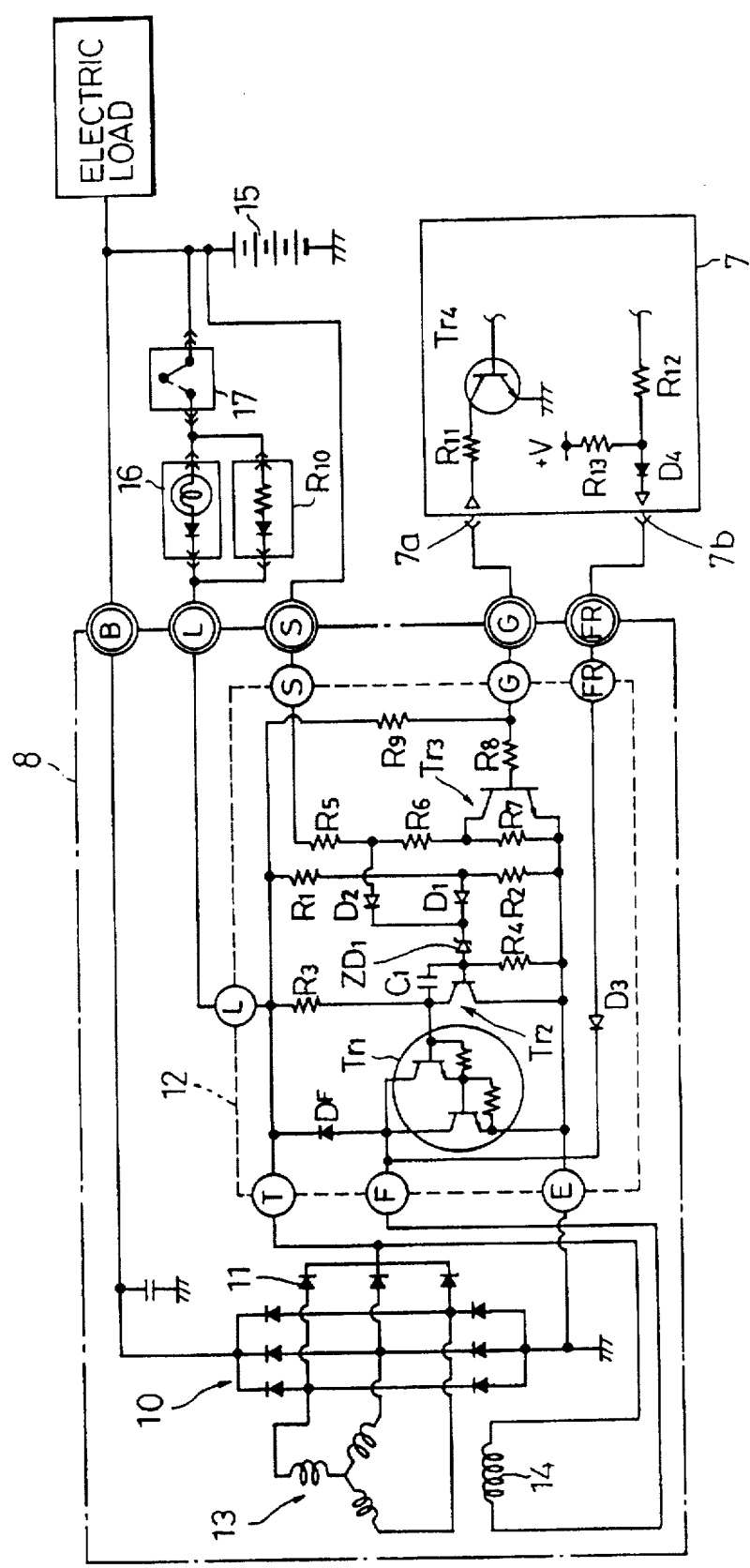
FIG. 2 is a circuit diagram showing one embodiment of a charging circuit of an alternator of FIG. 1.

FIG. 2 shows a charging system for the alternator 8 of FIG. 1. The alternator 8 contains therein a rectifier circuit 10, auxiliary diodes 11, voltage regulator 12, stator coil 13, and field coil 14, and has five terminals, i.e., B, L, S, G and FR terminals. Output terminals of the stator coil 13 are connected to the B terminal via the rectifier circuit 10, and are also connected to a T terminal of the voltage regulator 12 and one end of the field coil 14 through their corresponding auxiliary diodes 11. The other end of the field coil 14 is connected to an F terminal of the voltage regulator 12.

The voltage regulator 12 is composed of an IC circuit of a battery voltage detection type in which voltage detection is based on a battery, and has seven terminals, i.e., F, E, L, S, G and FR terminals plus the T terminal, and three transistors Tr1, Tr2 and Tr3. The L terminal is connected to the E terminal via the T terminal and a series circuit of resistors R1 and R2, while the S terminal is connected to the E terminal through a series circuit of resistors R5, R6 and R7. The collector of the transistor Tr2 is connected to the L terminal through a resistor R3, and the emitter thereof to the E terminal. The base of the transistor Tr2 is connected to the junction of the resistors R1 and R2 through a Zener diode ZD1 and a diode D1, to the E terminal through a resistor R4, and to the collector through a capacitor C1. The junction of the Zener diode ZD1 and the diode D1 is connected to the junction of the resistors R5 and R6 through a diode D2.

The collector of the power transistor Tr1 is connected to the F terminal, to the T terminal through a flywheel diode $D_F$, and to the FR terminal through a diode D3. The base and emitter of the power resistor R1 are connected to the collector of the transistor Tr2 and the E terminal, respectively. The transistor Tr3 has its collector connected to the junction of the resistors R6 and R7, its emitter to the E terminal, and its base to the G terminal through a resistor R8. The G terminal is connected to the L terminal through a resistor R9. Moreover, the F terminal is connected to the FR terminal via the diode D3, while the E terminal is Grounded together with an earth terminal of the rectifier circuit 10.

The B, L and S terminals of the alternator 8 are connected to a positive terminal of a battery 15 and various electric loads (not shown), to the positive terminal of the battery 15 through a parallel circuit of a charge lamp 16 and a resistor R10 and an ignition switch 17, and directly to the positive terminal of the battery 15, respectively. Moreover, the G and FR terminals of the alternator 8 are connected to terminals 7a and 7b of the engine control unit 7, respectively.

The terminal 7a of the engine control unit 7 is connected to the collector of a transistor Tr4 through a resistor R11. The transistor Tr4 has its emitter grounded and its base connected to a control circuit (not shown). The terminal 7b is connected to the control circuit through a diode D4 and a resistor R12, and the junction of the diode D4 and the resistor R12 is connected to a power source +V through a resistor R13.

The following is a description of operation.

When the ignition switch 17 is turned on, current flows through the battery 15, the charge lamp 16, and the field coil 14 and the power transistor Tr1 of the alternator 8 in the order named, whereupon the lamp 16 glows, and an initial exciting current flows through the field coil 14. At this start of operation, the output voltage of the auxiliary diodes 11, that is, the input voltage at the T terminal of the voltage regulator 12, is not higher than a predetermined voltage, and the transistors Tr2 and Tr1 are off and on, respectively. When the engine is started to rotate the alternator 8, thereby initiating power generation, the voltage at the T terminal is made equal to the battery voltage, so that the charge lamp 16 goes out. At the same time, a field current is supplied from the auxiliary diodes 11 to the field coil 14 to continue the power generation, and a generated current is delivered from the rectifier circuit 10 to the B terminal, and supplied to the electric loads, such as headlights. Also, the battery 15 is charged.

When the output voltage of the alternator 8 exceeds the predetermined voltage, the transistors Tr2 and Tr1 are turned on and off, respectively. Thereupon, the field current of the field coil 14 of the alternator 8 goes on flowing through the flywheel diode $D_F$ due to the presence of an inductance component of the coil 14, and the output current of the alternator 8 is reduced by a margin corresponding to the field current which flows through the coil 14.

As the output current of the alternator 8 is reduced in this manner, the output voltage increases slightly. Since the field current is reduced, however, the output voltage decreases gradually. When the predetermined voltage is reached, the transistor Tr2 is turned off, while the power transistor Tr1 is turned on again. As these processes of operation are repeated, the output voltage is adjusted to the level of the predetermined voltage. Thus, the power transistor Tr1 are repeatedly turned on and off. The intensity of the output current of the alternator 8 is settled depending on the proportion of the on-time of the power transistor Tr1.

The voltage at the FR terminal of the alternator 8 goes low when the power transistor Tr1 is turned on, and goes high when the transistor Tr1 is turned off. Accordingly, the output current of the alternator 8 can be detected by calculating the proportion of the period during which the FR terminal is on the low level. More specifically, the conduction state (on or off state) of the field coil 14 is delivered from the FR terminal of the alternator 8 to the engine control unit 7. In response to a signal for the on or off state, the unit 7 detects the output current of the alternator 8. In accordance with the detected output current, the unit 7 drives the ISC valve 5 to control the intake of air sucked into the engine 1.

The engine control unit 7 subjects the conduction between the G terminal of the alternator 8 and the ground to duty control, thereby controlling the output current of the alternator 8. Thus, in the idling mode, the unit 7 turns on and off the transistor Tr4 to subject the conduction between the G terminal of the alternator 8 and the ground to duty control, thereby limiting the output current of the alternator 8. At this time, the off duty of the G terminal is controlled so as to be equal to the on duty of the power transistor Tr1 of the voltage regulator 12. When the transistor Tr4 is off so that there is no conduction between the G terminal of the alternator 8 and the ground (duty ratio Dg mentioned later is set to be 100%), the transistor Tr3 is normally on. When the voltage at the S terminal of the alternator 8 reaches a first predetermined voltage (e.g., 14.4 volts), the power transistor Tr1 is turned off, so that the field current is cut off to stop the power generation. Thus, the output voltage of the alternator 8 is adjusted to the aforesaid predetermined voltage.

When the transistor Tr4 is turned on so that the G terminal of the alternator 8 is shorted to the ground (duty ratio Dg is set to be 0%), the transistor Tr1 is made to be normally off. In this case, the power transistor Tr1 is turned on when the S terminal voltage of the alternator 8 reaches a second predetermined voltage (e.g., 12.3 volts).

Thus, the interruption of the power generation (cut-off of field current) of the alternator 8 can be controlled externally, and the power generation rate can be controlled by setting the proportion of the period during which the G terminal is not grounded, that is, the G terminal duty ratio Dg, at a suitable value. If the output voltage of the alternator 8 drops to the aforesaid predetermined voltage, then it is lower than the voltage of the charged battery 15, so that hardly any current is supplied from the alternator 8.

Figure 8A:
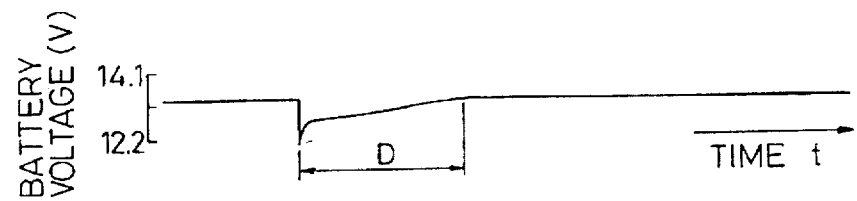
Figure 8B:
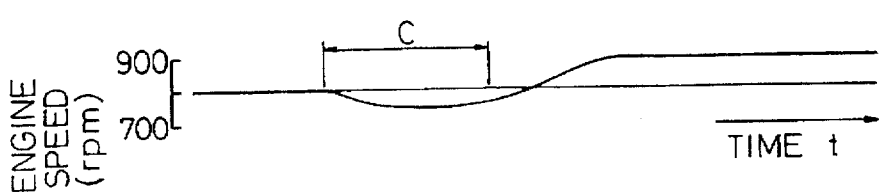
Figure 8C:
Figure 8D:
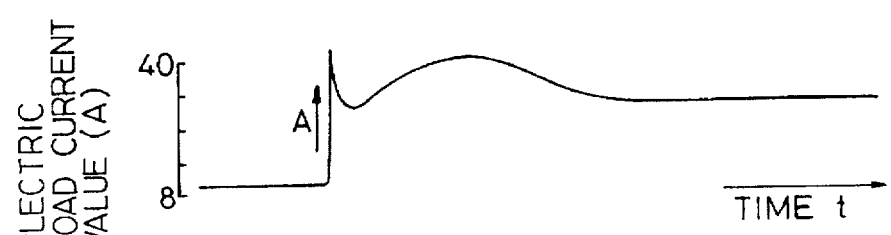
Figure 8E:
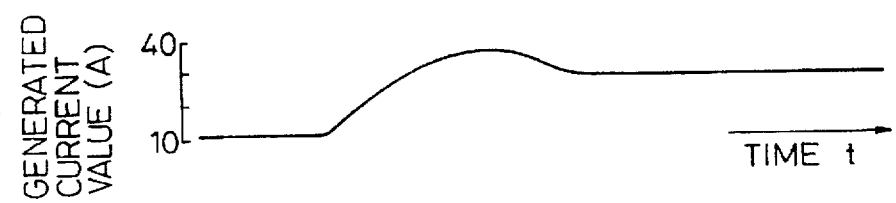
Figure 9A:
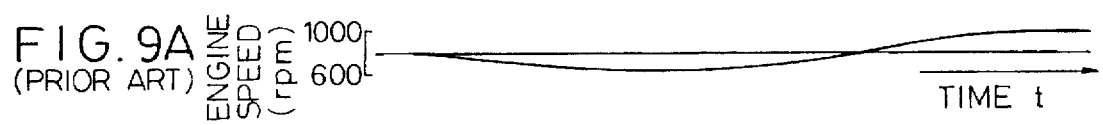
Figure 9B:
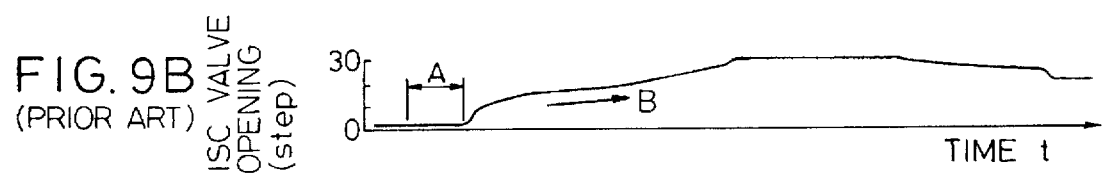
Figure 9C:
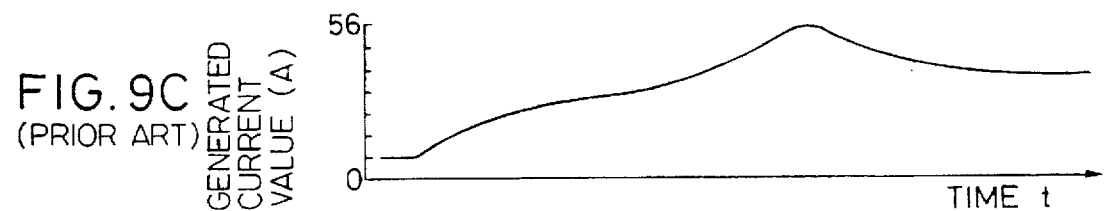
Figure 9D:
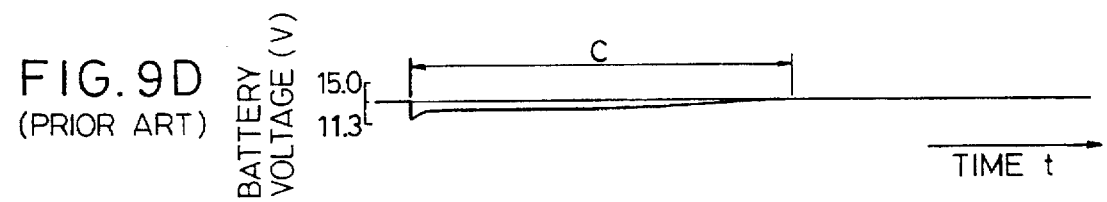

If any electric loads, e.g., the headlights, are turned on in the idling mode, the current consumption increases suddenly (as indicated by arrow A in FIG. 8D). The battery voltage instantaneously drops before the power generation rate increases accompanying the sudden increase of the load current (FIG. 8A). After the battery voltage is lowered, the alternator 8 operates so as to increase the power generation rate (FIG. 8E). Thus, the battery voltage responds earliest to the sudden increase of the electric loads. The drop of the battery voltage depends on the size of the electric loads. In other words, the electric loads require a current value higher than the power generation rate of the alternator 8 when the battery voltage is lowered.

The engine control unit 7 detects the battery voltage value, estimates a battery current consumption value from the difference between the detected voltage value and a predetermined value set beforehand, and obtains an electric load current value to be delivered from the alternator 8 according to the sum of the estimated current consumption value and the generated current value of the alternator 8. The power generation rate of the alternator 8 can be obtained from the on duty of the field coil 14 and the engine speed. Based on the electric load current value thus obtained, the presence/absence of the electric loads is determined, the opening of the ISC valve 5 is settled, and the valve 5 is controlled to increase the intake of air which flows through the by-pass passage 4 (FIG. 8C). Thus, when the predicted load current value exceeds a predetermined value, the ISC valve 5 is opened to increase the air intake quickly.

Immediately after an electric load is applied, the engine control unit 7 quickly detects this load application from the drop of the battery voltage, and causes the ISC valve 5 to open wide. On the other hand, the unit 7 increases the generated current value of the alternator 8 at a rate corresponding to the increase of the air intake (FIG. 8E), thereby equilibrating the load torque (power generation rate) and output torque (air intake). As a result, the reduction of the engine speed is lessened, so that the idle operation can enjoy high stability against fluctuations of the electric loads (FIG. 8B).

Referring now to the flowcharts of FIGS. 3 to 7, a method for stabilizing the idle operation against the sudden increase of the electric loads will be described.

Figure 3:
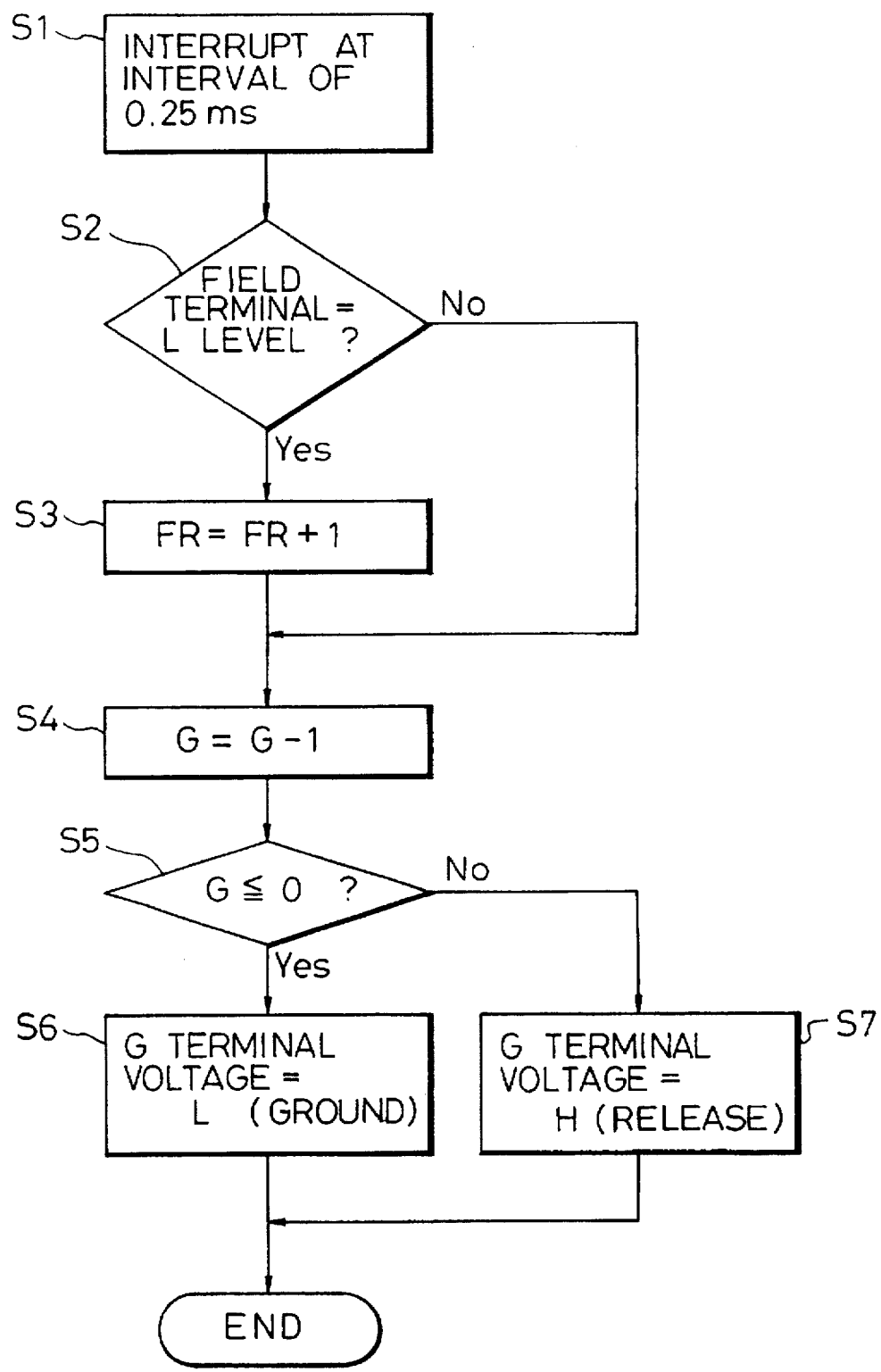
FIG. 3 is a flowchart showing a control sequence for field terminal signal level counting and G terminal duty drive for the alternator of FIG. 2.

A control sequence for signal level (low level) counting for the FR terminal and G terminal duty drive in connection with the alternator 8 will be described first. Referring to FIG. 3, the engine control unit 7 causes interruption with every period of, e.g., 0.25 ms by timer interruption (Step S1), and determines whether or not the signal level of the field terminal FR is low (Step S2). This routine may be executed by interruption based on crank pulses which are generated with every predetermined crank angle of the engine, in place of the timer interruption.

If the decision in Step S2 is Yes (low level), a count value FR of an FR counter is incremented by 1 (Step S3), whereupon the program advances to Step S4. If the decision in Step S2 is No, the program advances directly to Step S4. In Step S4, a count value G in a G counter is decremented by 1. Then, whether or not the value in the G counter is 0 or less is determined in Step S5. If the counter value G is 0 or less, the G terminal is set on the low level (L-level) or grounded, whereupon the routine concerned is finished (Step S6). If the value G is greater than 0, the G terminal is set on the high level (H-level) or released, whereupon the routine concerned is finished (Step S7).

In the alternator 8, as mentioned before, the transistor Tr3 (FIG. 2) is normally off when the G terminal is on the L-level. When the voltage at the S terminal reaches the aforesaid second predetermined voltage, the power transistor Tr1 is turned off, and the output voltage is adjusted to this predetermined voltage. When the G terminal is on the H-level, on the other hand, the transistor Tr3 is normally on. When the S terminal voltage reaches the aforesaid first predetermined voltage, the power transistor Tr1 is turned off, and the output voltage is adjusted to this predetermined voltage.

Figure 4:
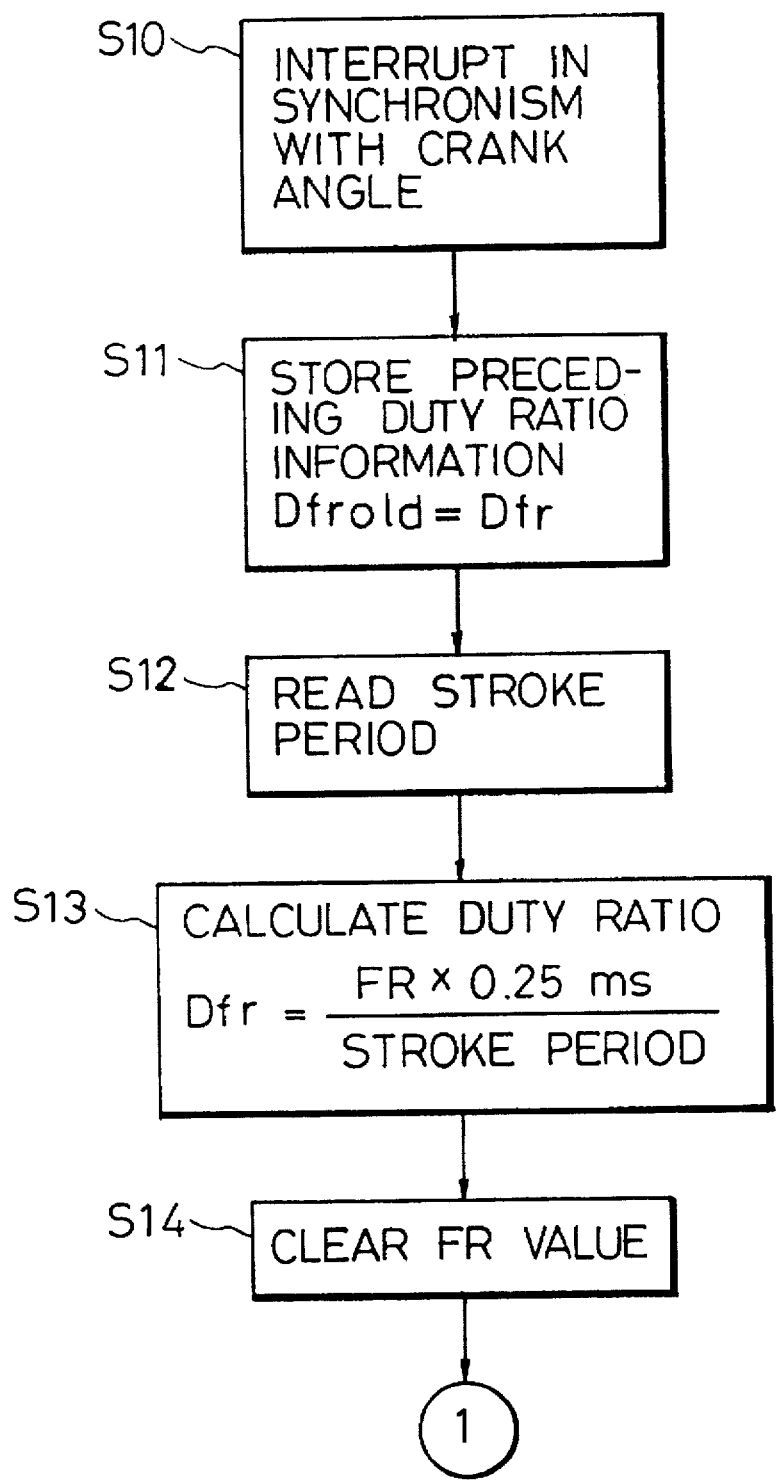
FIG. 4 is a part of a flowchart showing a control sequence for the calculation of the field duty ratio, generated current value, and electric load current value, determination of the electric loads, and G terminal duty drive for the alternator of FIG. 2.
Figure 5:
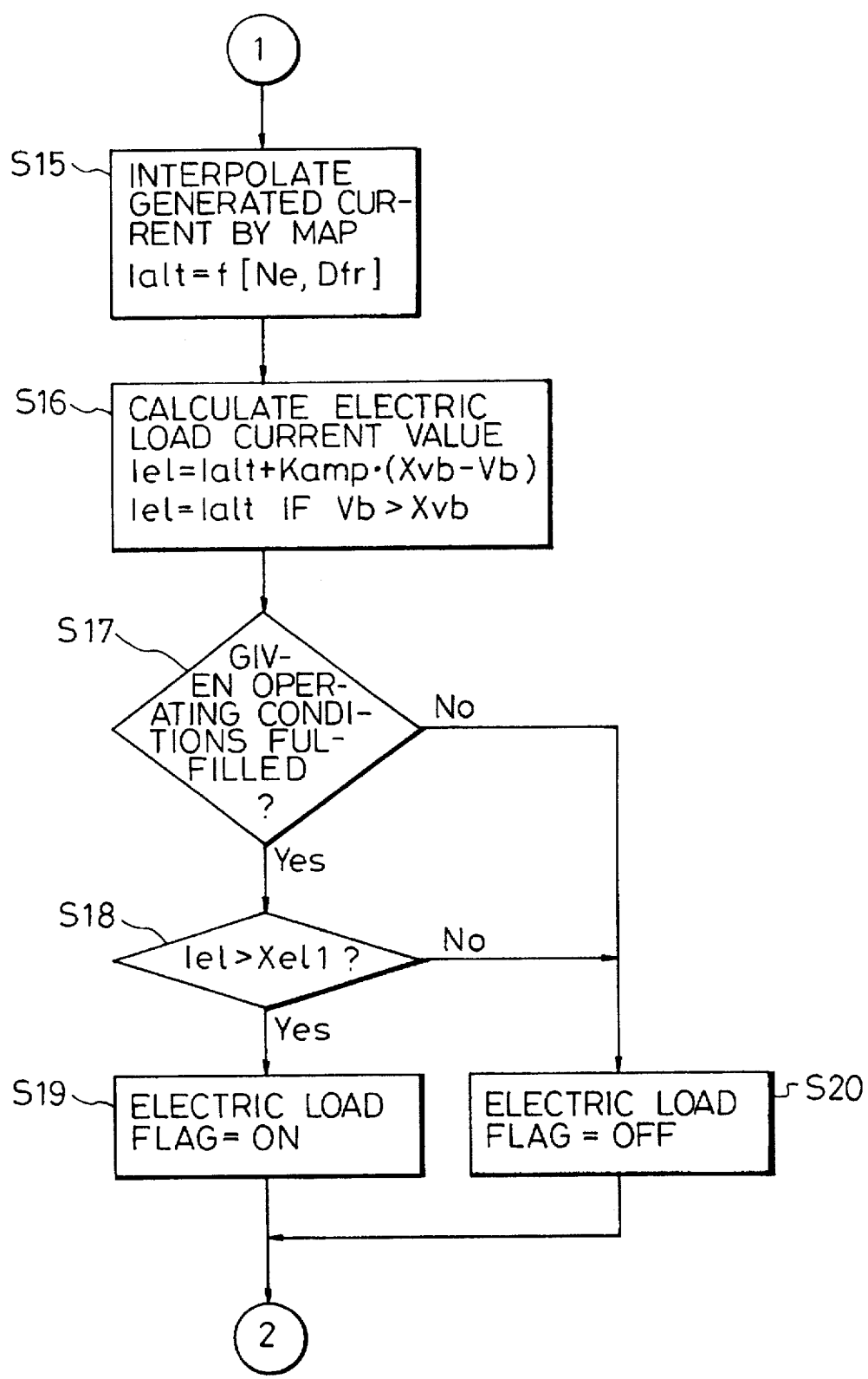
FIG. 5 is another part of the flowchart subsequent to the control sequence of FIG. 4.
Figure 6:
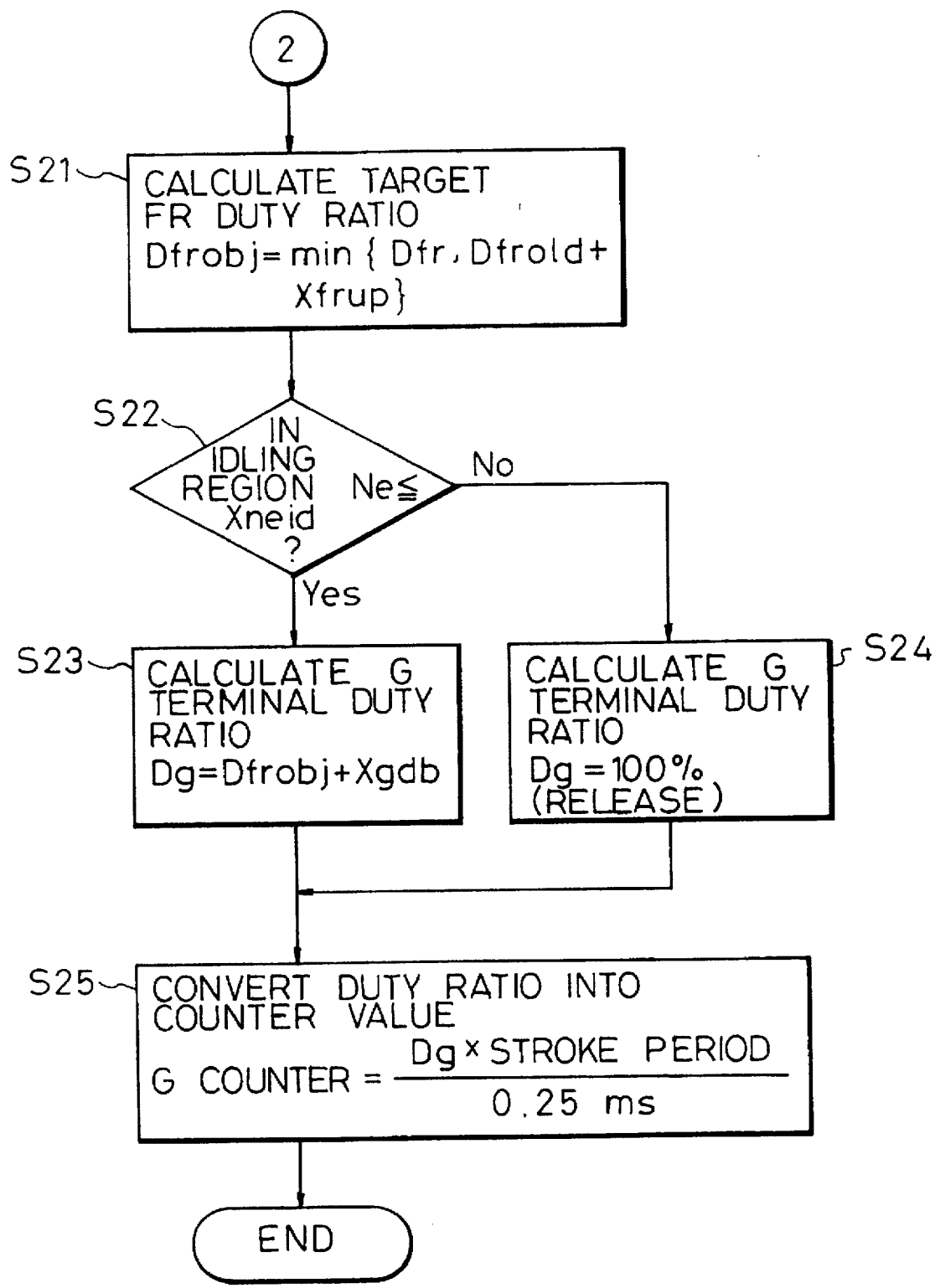
FIG. 6 is the remainder of the flowchart subsequent to the control sequence of FIG. 5.

Referring now to the flowcharts of FIGS. 4 to 6, several steps of procedure, including calculation of the duty ratio of the field current flowing through the field coil 14, estimation of the generated current value and electric load current value, determination of the electric loads, G terminal duty drive, and ISC electric load correction, will be described.

First, interruption is made in synchronism with the crank angle (Step S10 of FIG. 4), an FR duty ratio Dfold for the preceding cycle is loaded into a memory (Step S11), the stroke period of a crank shaft is read (Step S12), an FR duty ratio Dfr for the present cycle is calculated in accordance with the counter value FR obtained in Step S3, and the counter value FR is cleared to be 0 (Step S14).

*Dfr=Counter value FR×0.25 ms/stroke period.*

Subsequently, a generated current Ialt of the alternator 8 is obtained from the calculated FR duty ratio Dfr and an engine speed Ne with reference to a map (Step S15 of FIG. 5).

*Ialt=f[Ne, Dfr].*

More specifically, the higher the engine speed Ne, and the higher and the FR duty ratio Dfr of the field current flowing through the field coil 14, the greater the map values for the calculation of the generated current value Ialt will be. The map values corresponding to the duty ratio Dfr calculated in Step S13 and the detected engine speed Ne are read out, and the generated current value Ialt is obtained from these map values by the interpolation method.

An electric load current value Iel is calculated according to the following equation based on the alternator generated current value Ialt (Step S16):

$$\begin{aligned}\text{Electric load current value Iel} &= \text{Alternator generated}\\&\quad\text{current value}+\text{Battery}\\&\quad\text{current consumption value}\\&= \text{Ialt}+\text{Kamp}\cdot(Xvbn-Vb),\end{aligned}$$

where Kamp is a coefficient of conversion from the battery voltage value to a current value, Xvb is a reference voltage value (e.g., 14 volts) of the battery, and Vb is a detected battery voltage value. If the detected battery voltage value Vb is greater than the reference voltage value Xvb, however, the electric load current value Iel is obtained according to the following equation:

*Electric load current value Iel=Ialt.*

After the electric load current value Iel is calculated, it is determined whether or not the engine is in a predetermined operation mode which allows low-speed rotation for idling (Step S17). It is concluded that the engine is in this predetermined operation mode when all of the following conditions (1) to (4) are fulfilled.

(1) Elapsed time after start≧XTWOIC, (2) Engine cooling water temperature≧XWTFB, (3) Idling switch ON, (4) Air conditioner switch OFF.

Here XTWOIC is adjusted to a value which is equivalent to an ISC feedback control inhibiting time (e.g., 3 to 10 seconds) after the start of the engine operation, and XWTFB is adjusted to the value of the engine cooling water temperature which allows the start of fuel supply feedback control (based on the oxygen concentration of exhaust gas).

When the engine is in the predetermined operation mode, it is determined whether or not the electric load current value Iel is greater than a no-load reference current value Xel1 (e.g., 10 amperes) (Step S18). If the former is greater than the latter (Iel>Xel1), an electric load flag is turned on (Step S19). If the decision in either Step S17 or S18 is No, the electric load flag is turned off (Step S20), whereupon the program advances to Step S21 in FIG. 6. In Step 21, a target FR duty ratio Dfrobj is calculated according to the following equation:

*Dfrobj=min{Dfr, Dfrold+Xfrup}.*

The target FR duty ratio Dfrobj calculated in Step S21 is adjusted to a smaller one of two values, the FR duty ratio Dfr obtained by the execution of the routine for the present cycle and the sum of an FR duty ratio Dfrold obtained by the execution of the routine for the preceding cycle and an allowable increment Xfrup of the FR duty. Thus, the target FR duty ratio Dfrobj is prevented from increasing suddenly.

Then, in Step S22, whether or not the engine is in an idling region is determined under the following condition:

$$N \leq Xneid,$$

where Xneid is an idling region decision value. If it is concluded in Step S22 that the engine is in the idling region, the program advances to Step S23. If the engine is not in the idling region, the program advances to Step S24, whereupon the G terminal duty ratio Dg is calculated for each step.

In Step S23, the G terminal duty ratio Dg is calculated according to the following equation:

$$Dg = Dfrobj + Xgdb,$$

where Xgdb is an infinitesimal dead-zone value. When the engine is in the idling region, the power generation rate of the alternator 8 is continually subjected to duty control based on the G terminal duty ratio Dg.

In Step S24, on the other hand, the G terminal duty ratio Dg is calculated according to the following equation:

$$Dg = 100\%.$$

Then, in Step S25, the calculated G terminal duty ratio Dg is reduced to the G counter value according to the following equation, whereupon the routine concerned is finished:

$$\text{Counter value } G = Dg \times \text{stroke period}/0.25 \text{ ms}.$$

In the alternator 8, the initial value of the aforesaid counter value G obtained in Step S4 is adjusted to a value corresponding to the power generation rate of 60% when the G terminal duty ratio Dg is 60%, for example. As the routine of FIG. 3 is executed with every 0.25 ms, the G terminal voltage level is controlled, so that the power generation rate is adjusted to 60%.

The value of the target FR duty ratio Dfrobj never increases suddenly. Thus, even if the FR duty ratio Dfr for the present cycle increases suddenly (Dfr>Dfrold+Xgdb), the target FR duty ratio Dfrobj cannot be set at a value greater than the sum of the value Dfrold for the preceding cycle and the increment Xfrup. The sum of the target FR duty ratio Dfrobj and the dead-zone value Xgdb is used as the G terminal duty ratio Dg for the present cycle. Thus, the G terminal duty ratio Dg increases slowly, so that the alternator power generation rate increases gently.

Figure 7:
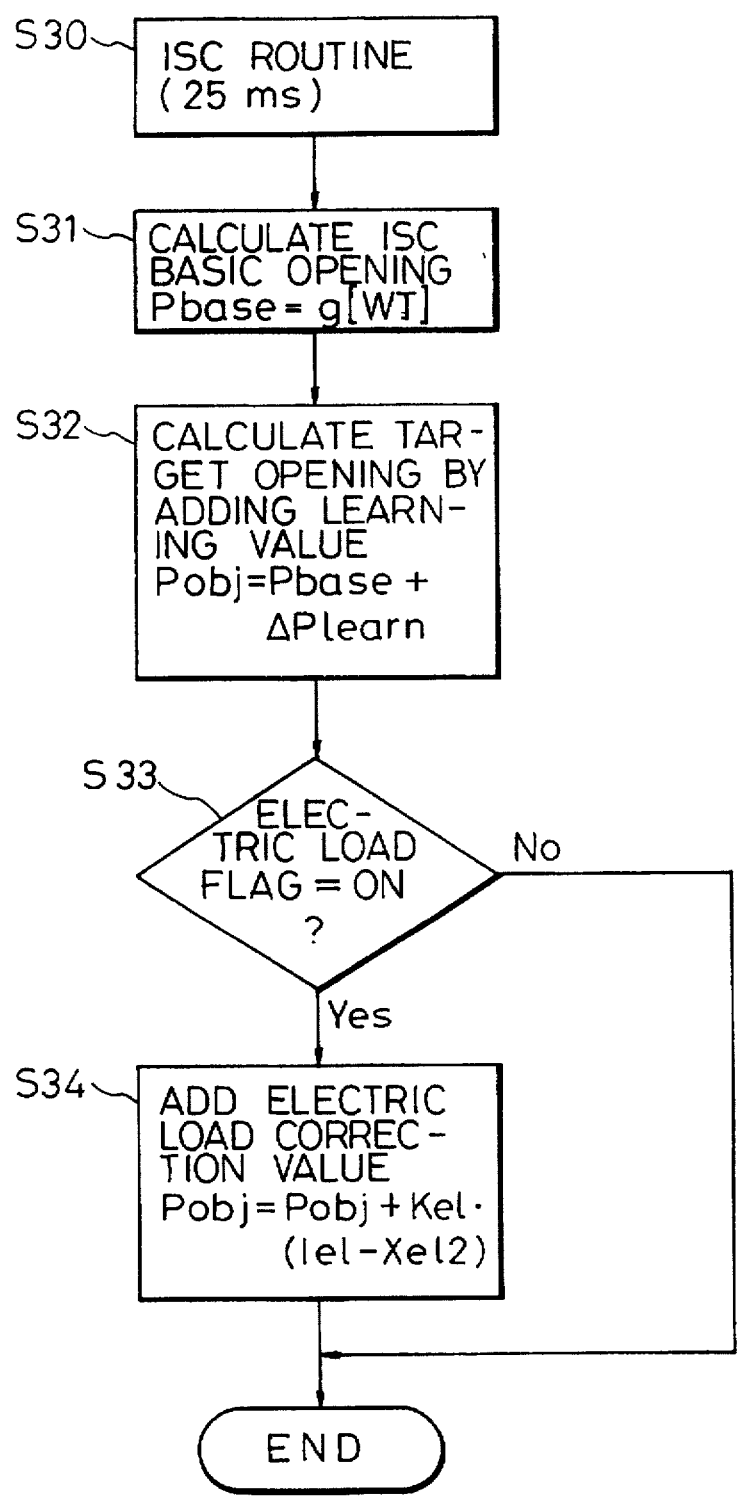
FIG. 7 is a flowchart showing a control sequence for ISC electric load correction.

Subsequently, in Step S30 of FIG. 7, the ISC routine is executed with every predetermined period (of e.g., 0.25 ms) in response to interruption, and ISC electric load correction is executed. The following is a description of steps of procedure for the correction.

First, a basic opening Pbase of the ISC valve 5 is calculated (Step S31). The basic opening Pbase is calculated according to a map g[WT] with use of the engine cooling water temperature as a parameter, for example. Then, a learning value ΔPlearn is added to the basic opening Pbase to Calculate a target opening Pobj of the ISC valve 5 (Step S32). In this embodiment, the target opening Pobj is represented by the number of steps of the stepping motor as a valve opening controlled variable of the ISC valve 5. Alternatively, however, it may be represented in terms of the movement of the stem of the valve 5 or the like.

$$\text{Target by-pass valve opening } Pobj = Pbase + \Delta Plearn.$$

The learning value ΔPlearn is used to modify the change of the relationship between the ISC valve opening and the by-pass air intake rate which is attributable to lowering of the engine performance, such as clogging of the ISC valve 5, or change of the atmospheric conditions. The value ΔPlearn is obtained as the time-based average of variations of the set basic opening Pbase, for example, on the basis of learning during the engine operation. Despite the lowering of the engine performance or the change of the atmospheric conditions, the idling speed of the engine can be kept at its target value, which corresponds to the engine cooling water temperature, by the use of the learning value ΔPlearn.

Then, it is determined whether or not the electric load flag is on (Step S33). If the electric load flag is on, an electric load correction is added to the target opening Pobj of the ISC valve 5 calculated in Step S32, according to the following equation, thereby correcting target opening Pobj (Step S34), whereupon the routine concerned is finished.

$$\text{Electric load correction value} = Kel \cdot (Iel - Xel2),$$

where Xel2 is a reference current value for electric load correction, which is set to be smaller than the aforesaid no-load reference current value Xel1 (Xel2<Xel1). The value Kel is a conversion factor for conversion from the current value to the valve opening value.

$$\text{Target by-pass valve opening } Pobj = Pobj + Kel \cdot (Iel - Xel2).$$

FIG. 8 show, by way of example, response characteristics obtained in the idling mode of the idle-cylinder engine to which the present invention is applied. When an electric load is applied to cause the battery voltage to drop instantaneously (FIG. 8A), the electric load current value calculated in Step S16 can be changed suddenly, as indicated by arrow A in FIG. 8D, so that the responsiveness of the electric load decision is improved. Thus, the opening of the ISC valve is stepped up (as indicated by arrow B in FIG. 8C), and the power generation inhibiting period of the alternator basically may be as short as an intake response delay time (period C of FIG. 8B). Also, the battery discharge period (period D of FIG. 8A) is shortened, so that the period during which the engine speed is lowered is shortened (FIG. 8B). In this manner, the response characteristic of the idling speed control is improved considerably.

According to the embodiment described above, the electric load correction reference current value Xel2 is set to be smaller than the no-load reference current value Xel1, and a certain dead zone is provided for the detection of the generation of the electric load. While this small reference current value Xel2 is used to ensure the detection of the generation of the electric load, the other relatively small decision value Xel1 is used to obtain the required increment of the air intake securely after the generation of the electric load is detected. For simplicity, however, these decision values may be equalized.

The generation of the electric load can be detected by using the result of comparison between the electric load current value Iel and its reference value. In setting the increment of the air intake (target by-pass valve opening), however, the result of comparison between the generated current value Ialt and its reference value may be used instead.

What is claimed is:

1. An idling speed control method for an internal combustion engine, in which a field current of an alternator is turned on and off to control a power generation rate of the alternator in accordance with a terminal voltage of a battery, and an air intake of the internal combustion engine is increased or decreased to keep an engine speed at a target speed during an idle operation of the engine, such that, when an electric load suddenly increases during the idle operation of the engine, the field current of the alternator is gradually increased toward a field current value corresponding to the suddenly increased electric load, comprising:

detecting the battery voltage;

estimating a battery current consumption value from a state of change in the detected battery voltage;

determining a generated current value of the alternator without directly detecting current generated by the alternator;

calculating a target value of an electric load current to be outputted from the alternator, based on the estimated battery current consumption value and the determined current value of the alternator; and increasing the air intake based on the calculated target value of the electric load current, wherein said air intake is increased when a first set value is exceeded by the calculated target value of the electric load, and an increment of said air intake is set based on a difference between the calculated target value and a second set value, and wherein said intake air is increased only when such detected battery voltage decreases to an extent that charging of the battery is required due to the determined alternator current value.

2. The idling speed control method according to claim 1, wherein said second set value is set to be smaller than said first set value.

3. The method of claim 1, wherein said estimating step estimate the battery current consumption value from a difference between the detected battery voltage and a reference value.

4. An idling speed control apparatus for an internal combustion engine, which includes a battery, an electric device, an alternator adapted to be rotated by the engine to supply electric power to the electric device and charge the battery, and alternator control unit adapted to turn on and off a field current supplied to the alternator, thereby controlling a power generation rate of the alternator in accordance with a terminal voltage of the battery, such that when an electric load of the electric device suddenly increases, the field current of the alternator is gradually increased toward a field current value corresponding to the suddenly increased electric load of the electric device, and an air intake control valve provided in an intake passage of the engine, and in which the air intake of the engine is increased and decreased by opening and closing the air intake control valve, to keep an engine speed at a target speed during an idle operation of the engine, comprising:

battery voltage detecting means for detecting the battery voltage;

estimating means for estimating a battery current consumption value from a state of change in the detected battery voltage;

current detecting means for determining a generated current value of the alternator without directly detecting current generated by the alternator;

load current value calculating means for calculating a target value of an electric load current to be outputted from the alternator based on the estimated battery current consumption value and the determined current value of the alternator; and valve opening control means for increasing the opening of the air intake control valve based on the calculated target value of the electric load current, wherein said air intake is increased when a first set value is exceeded by the calculated target value of the electric load, and an increment of said air intake is set based on a difference between the calculated target value and a second set value, and wherein said intake air is increased only when such detected battery voltage decreases to an extent that charging of the battery is required due to the determined alternator current value.

5. The idling speed control apparatus according to claim 4, wherein said second set value is set to be smaller than said first set value.

6. The apparatus of claim 4, wherein said estimating means estimates the battery consumption value from a difference between the detected battery voltage and a reference value.

* * * * *